United States Patent
Ron et al.

(10) Patent No.: US 8,866,440 B2
(45) Date of Patent: Oct. 21, 2014

(54) BATTERY CHARGER WITH SENSOR-ACTIVATED LIGHT SOURCE

(71) Applicant: Google Inc., Mountain View, CA (US)

(72) Inventors: Uri Ron, Kfar Saba (IL); Eyal Bychkov, Hod Hasharon (IL)

(73) Assignee: Google Inc., Mountain View, CA (US)

(*) Notice: Subject to any disclaimer, the term of this patent is extended or adjusted under 35 U.S.C. 154(b) by 30 days.

(21) Appl. No.: 13/761,175

(22) Filed: Feb. 7, 2013

(65) Prior Publication Data
US 2013/0162145 A1 Jun. 27, 2013

Related U.S. Application Data

(62) Division of application No. 12/552,302, filed on Sep. 2, 2009, now Pat. No. 8,378,631.

(51) Int. Cl.
*H02J 7/00* (2006.01)
*H05B 37/02* (2006.01)

(52) U.S. Cl.
CPC .............. *H02J 7/0042* (2013.01); *H05B 37/02* (2013.01)
USPC ......... 320/114; 362/276; 340/635; 340/636.2

(58) Field of Classification Search
USPC ............ 362/95, 183, 253, 276; 320/107, 114; 340/635, 636.15, 636.19, 636.2, 657
See application file for complete search history.

(56) References Cited

U.S. PATENT DOCUMENTS

| | | | |
|---|---|---|---|
| 4,611,265 A | 9/1986 | Davis | |
| 4,802,065 A * | 1/1989 | Minter et al. | 362/20 |
| 4,890,208 A * | 12/1989 | Izenour | 362/294 |
| 4,894,601 A * | 1/1990 | Watkins | 320/134 |
| 4,901,461 A | 2/1990 | Edwards et al. | |
| 5,349,330 A * | 9/1994 | Diong et al. | 340/567 |
| 5,489,891 A * | 2/1996 | Diong et al. | 340/567 |
| 5,587,645 A * | 12/1996 | Sciammarella et al. | 362/253 |
| 5,634,710 A | 6/1997 | Di Russo et al. | |
| 5,823,660 A | 10/1998 | Hsu | |
| 6,639,382 B1 | 10/2003 | Fan | |
| 6,690,141 B1 | 2/2004 | Yu | |
| 6,753,671 B1 | 6/2004 | Harvey | |
| 6,805,469 B1 | 10/2004 | Barton | |
| 6,827,462 B2 | 12/2004 | Wangenheim et al. | |
| 6,926,451 B2 | 8/2005 | Cauwels et al. | |
| 6,986,589 B2 * | 1/2006 | Evans et al. | 362/20 |
| 6,994,452 B2 * | 2/2006 | Rozenberg et al. | 362/183 |
| 7,073,923 B2 | 7/2006 | Cope | |
| 7,118,235 B2 * | 10/2006 | Barton | 362/20 |
| 7,360,917 B2 | 4/2008 | Chien | |
| 7,690,802 B2 * | 4/2010 | Higley et al. | 362/20 |
| 7,768,415 B2 * | 8/2010 | Blackadar | 340/636.1 |
| 7,790,982 B2 | 9/2010 | Weeks et al. | |
| 2004/0204196 A1 | 10/2004 | Dunican et al. | |
| 2008/0054845 A1 | 3/2008 | Wang | |
| 2008/0233780 A1 | 9/2008 | Waters et al. | |
| 2009/0011647 A1 | 1/2009 | Lai | |

* cited by examiner

*Primary Examiner* — John A Ward
(74) *Attorney, Agent, or Firm* — Soquel Group LLC

(57) ABSTRACT

An electronic device, including a battery, a port for connecting a battery charger to charge the battery, a light emitter, and a sensor connected to the light emitter, for activating the light emitter when the sensor detects one or more vicinity light requirements indicating a need for light in the environment of the sensor, and for deactivating said light emitter when the battery charger is successfully connected to the port.

21 Claims, 4 Drawing Sheets

1

BATTERY CHARGER WITH SENSOR-ACTIVATED LIGHT SOURCE

PRIORITY REFERENCE TO RELATED APPLICATIONS

This application is a divisional of U.S. Ser. No. 12/552,302, entitled BATTERY CHARGER WITH SENSOR-ACTIVATED LIGHT SOURCE, and filed on Sep. 2, 2009 by inventors Uri Ron and Eyal Bychkov.

FIELD OF THE INVENTION

The present invention relates to battery chargers for electronic devices.

BACKGROUND OF THE INVENTION

Most electronic devices today, such as cell phones, PDAs, media players, GPS navigators, shavers and more, are battery operated, and use rechargeable batteries. These devices generally need to be charged on a regular basis. Cell phones, for example, are often charged on a daily basis.

There are various types of battery chargers in use today. Some chargers connect to standard power sources such as wall outlets, car outlets and USB plugs. Some chargers are solar powered. Some chargers, such as crank flashlights, are powered by motion.

Some battery chargers connect to electronic devices via a cradle, wherein the device to be charged is docked. Most battery chargers have a cable which connects to a device at one end and to a power source at the other end.

People generally find it difficult to connect a battery charger to a small electronic device in a dark environment, such as at night. Finding the small hole to plug in the charger cable is cumbersome, and is getting more cumbersome as devices and chargers shrink in size and change in shapes.

There is thus a need to facilitate connecting an electronic device to a battery charger in a dark environment.

SUMMARY OF THE DESCRIPTION

Aspects of the present invention relate to a battery charger with a light source that automatically activates when an electronic device is brought in proximity of the charger. More generally, the light source is activated when one or more vicinity light requirement conditions are detected, such conditions including inter alia the electronic device being in proximity of the charger, the environment being dark, the charger being moved, and an object moving in proximity of the charger. In one embodiment of the present invention, the light source is a component of the battery charger. In another embodiment of the present invention, the light source is a component of the electronic device.

According to further aspects of the present invention, the light source may also be activated manually by the user, by pressing a button or switch on or near the light source, or by such other user action.

There is thus provided in accordance with an embodiment of the present invention a battery charger for an electronic device, including a cable that connects to a source of power at one end, and to an electronic device at the other end, a light emitter connected to the cable, and a sensor connected to the cable and to the light emitter, for activating the light emitter when the sensor detects one or more vicinity light requirements indicating a need for light in the environment of the sensor.

There is additionally provided in accordance with an embodiment of the present invention an electronic device, including a battery, a port for connecting a battery charger to charge the battery, a light emitter, and a sensor connected to the light emitter, for activating the light emitter when the sensor detects one or more vicinity light requirements indicating a need for light in the environment of the sensor.

There is further provided in accordance with an embodiment of the present invention a method for facilitating connecting an electronic device to a battery charger, including automatically sensing one or more vicinity light requirements indicating a need for light in the environment of an electronic device and a battery charger, and in response to the automatically sensing, activating a light source, thereby facilitating connecting the electronic device to the battery charger by a user in the environment.

There is yet further provided in accordance with an embodiment of the present invention a battery charger for an electronic device, including a cable that connects to a source of power at one end, and to an electronic device at the other end, a light emitter embedded within the cable, and a sensor connected to the cable, for activating the light emitter when the sensor detects one or more vicinity light requirements indicating a need for light in the environment of the sensor.

There is moreover provided in accordance with an embodiment of the present invention a battery charger for an electronic device, including a cable that connects to a source of power at one end, and to an electronic device at the other end, a light emitter connected to the cable, and a control for activating the light emitter.

There is additionally provided in accordance with an embodiment of the present invention a battery charger for an electronic device, including a cable that connects to a source of power at one end, and to an electronic device at the other end, a light emitter embedded within the cable, and a control for activating the light emitter.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a battery charger with a light source for facilitating use of the charger in dark conditions. Further aspects of the present invention relate to a battery-operated device with a light source for facilitating connecting the device to a battery charger in dark conditions.

Figure 1:
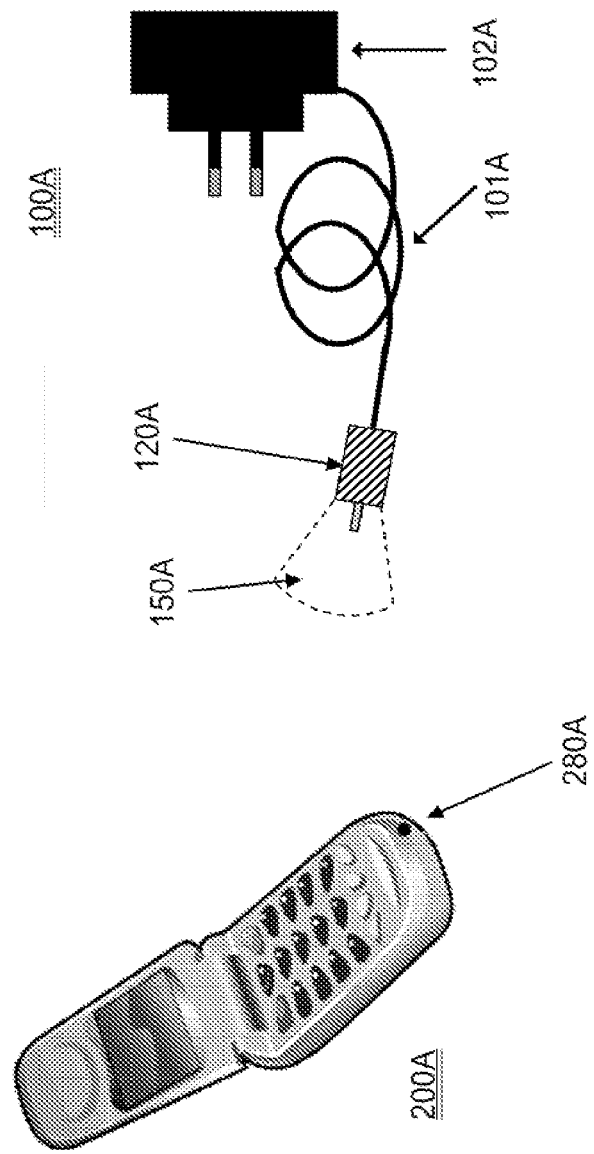
FIG. 1 is an illustration of a battery charger with a light source that is activated by a sensor, for facilitating connecting the battery charger to an electronic device, in accordance with an embodiment of the present invention.
Figure 2A:
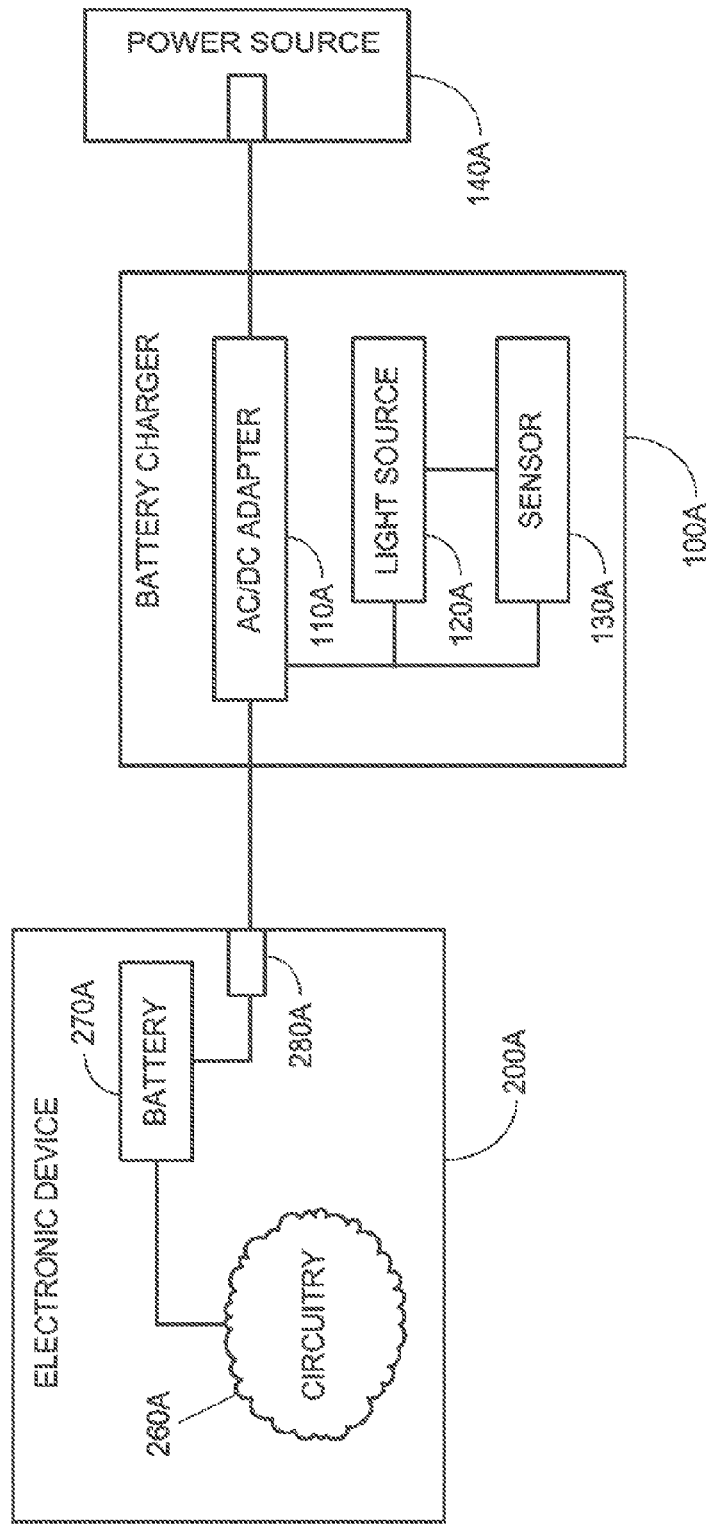
FIG. 2A is a simplified block diagram of a battery charger with a light source that is activated by a sensor, for facilitating connecting the battery charger to an electronic device, in accordance with an embodiment of the present invention.

Reference is made to FIGS. 1 and 2A, which are a respective illustration and a simplified block diagram of a battery charger 100A with a cable 101A and a plug 102A. Battery charger 100A includes an AC/DC adapter 110A. Battery charger 100A also includes a light source 120A that is activated by a sensor 130A and receives power from adapter 110A, for facilitating connecting battery charger 100A to an electronic device 200A, in accordance with an embodiment of the present invention. Plug 102A connects to a power source 140A. Electronic device 200A includes circuitry 260A that is operated by a battery 270A. Electronic device 200A includes a charger port 280A for inserting battery charger 100A.

Although electronic device 200A is shown in FIG. 1 as being a cell phone, it will be appreciated by those skilled in the art that the present invention is of advantage for a wide variety of electronic devices of all shapes and sizes, whether portable or stationary, and whether handheld or not conveniently carried by hand. Such devices include inter alia cell phones, PDAs, media players, GPS navigators, laptop computers, external hard drives, speakers, shavers and hair dryers.

Light source 120A is generally a small low-cost light emitting diode (LED). Light source 120A may include inter alia an incandescent light source, an ultraviolet light source, or a multi-color light source. Light source 120A may include more than one LED.

In an alternative embodiment of the present invention, light source 120A is embedded within cable 101A, using a neon cable, or using an illuminating wire, such as LyTec® Electroluminescent Wire developed and manufactured by ELAM EL Industries, Ltd. of Jerusalem, Israel, or using such other luminescent cable.

Sensor 130A may be a component of light source 120A, or a separate independent component.

When activated by sensor 130A, light source 120A emits a light beam 150A, thereby facilitating insertion of battery charger 100A into charger port 280A by a user. In accordance with embodiments of the present invention, sensor 130A is operative to activate light source 120A when sensor 130A detects one or more "vicinity light requirements". The term vicinity light requirement as used herein refers to a condition indicating a need for light enhancement in the vicinity of sensor 130A.

Vicinity light requirements are generally pre-specified conditions. Three types of vicinity light requirements used in specific implementations of the present invention are listed hereinbelow.

Proximity: An object is brought near sensor 130A, within a short distance. The model HSDL-9100-021 analog output reflective sensor manufactured by Avago Technologies of San Jose, Calif., may be used as a proximity sensor 130A in the present invention.

Lighting: Sensor 130A is in a dark environment, with low ambient light. The model APDS-9003 ambient light photo sensor manufactured by Avago Technologies of San Jose, Calif., may be used as a lighting sensor 130A in the present invention.

Motion: Sensor 130A detects motion. An accelerometer may be used as a motion sensor 130A in the present invention.

When one or more of such vicinity light requirements are detected, sensor 130A activates light source 100A, making it easier for a user to insert battery charger 100A into charger port 280A.

In some embodiments of the present invention, additional aural and/or tactile signals facilitate easy connection of the charger to the device. For example, different sounds are played as battery charger 100A gets closer to charger port 280A in electronic device 200A. The sounds are played from speakers in electronic device 200A or from speakers in charger 100A.

In an alternate embodiment of the present invention, the light source and sensor are components of the electronic device, instead of being components of the battery charger. In this regard, reference is made to FIG. 2B, which is a simplified block diagram of an electronic device 200B with a light source 220B that is activated by a sensor 230B, for facilitating connecting a battery charger 100B to the device, in accordance with an embodiment of the present invention.

Electronic device 200B includes circuitry 260B that receives power from a battery 270B. Battery charger 100B includes an AC/DC adapter 110B, and connects to a charger port 280B of electronic device 200B at one end, and to a power source 140B at the other end, to charge battery 270B. Sensor 230B activates light source 220B when it detects one or more vicinity light requirements, thus making it easier for a consumer to connect battery charger 100B to charger port 280B.

Figure 2B:
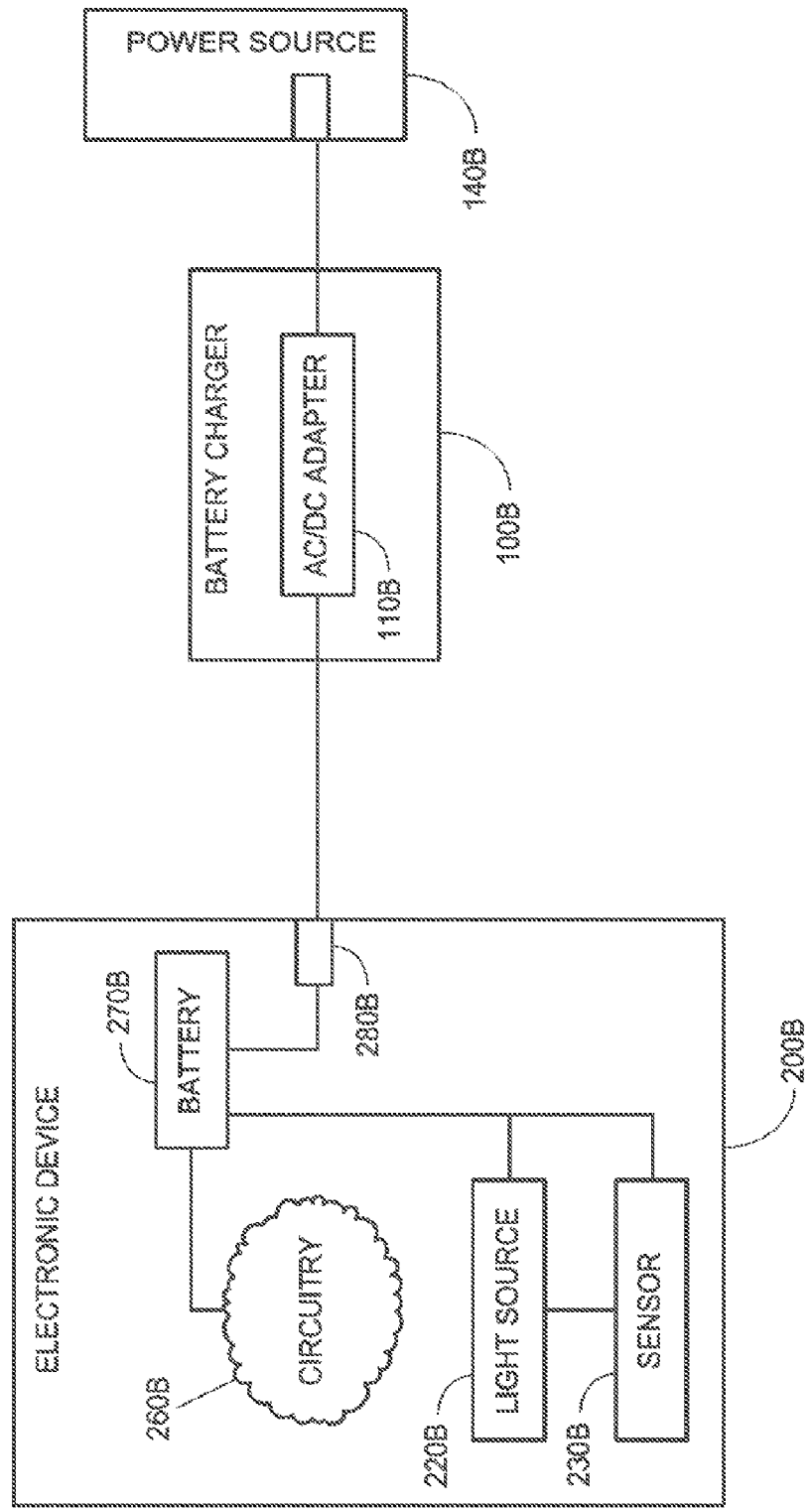
FIG. 2B is a simplified block diagram of an electronic device with a light source that is activated by a sensor, for facilitating connecting a battery charger to the electronic device, in accordance with an embodiment of the present invention.

It will be appreciated by those skilled in the art that each of the respective systems of FIG. 2A and FIG. 2B has its advantages and disadvantages. The system of FIG. 2A, with the light source and sensor being components of battery charger 100A, is of advantage in that the light source and sensor do not drain power from electronic device 200A. Moreover, with the system of FIG. 2A, electronic device 200A does not require the additional size or complexity necessary to support the light source and sensor. The system of FIG. 2B, with the light source and sensor being components of electronic device 200B, is of advantage in that these components interoperate with substantially all battery chargers.

According to an embodiment of the present invention, light source 120A or 220B may also be activated manually by the user, by pressing a button or switch on or near the light source, or by such other user action.

Figure 3:
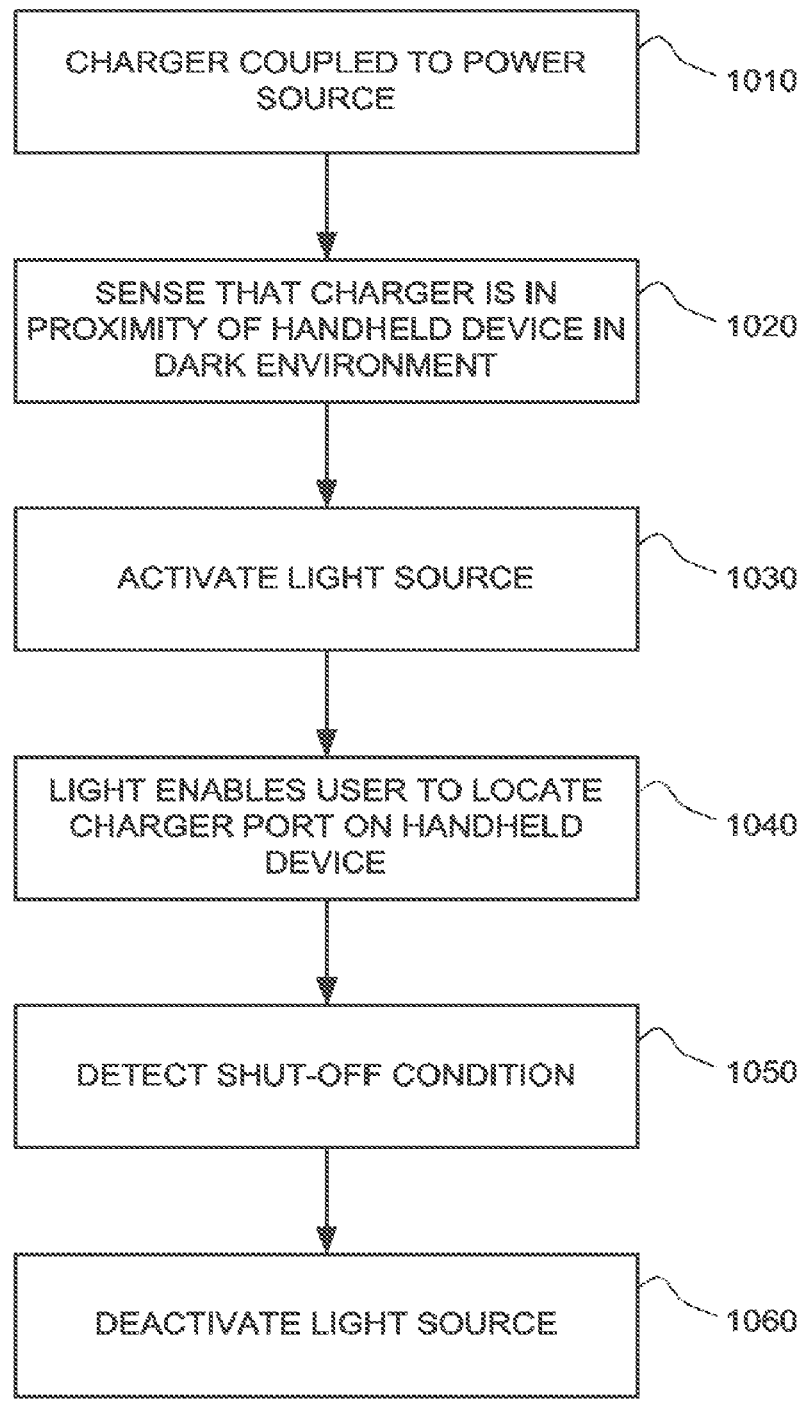
FIG. 3 is a simplified flowchart of a method for automatically activating a light source to facilitate connecting an electronic device to a battery charger, in accordance with an embodiment of the present invention.

Reference is made to FIG. 3, which is a simplified flowchart of a method for automatically activating a light source to facilitate connecting an electronic device to a battery charger, in accordance with an embodiment of the present invention. At step 1010 a battery charger is connected to a power source. At step 1020 a sensor detects that the battery charger is within close vicinity of the electronic device, and in a dark environment. Step 1020 is representative of a step of detecting one or more vicinity light requirements. In general, at step 1020 the sensor detects one or more pre-specified vicinity light requirements, such as one or more of the proximity, lighting and motion conditions listed hereinabove.

At step 1030 the sensor activates a light source, which emits light, facilitating connection of the battery charger with the electronic device at step 1040.

At step 1050 a shut-off condition is detected, indicating that the light is no longer required. The shut-off condition may be inter alis successful connection of the battery charger with the electronic device. Alternatively, the shut-off condition may be elapse of a pre-defined time span such as 30 seconds. Yet alternatively, the shut-off condition may be absence of motion in the vicinity of the sensor. At step 1060 the light source is deactivated, thereby shutting off the light.

As described hereinabove, the light source and sensor may be components of the battery charger or, alternatively, they may be components of the electronic device.

In reading the above description, persons skilled in the art will appreciate that there are many apparent variations that can be applied to the methods and systems described. One such variation is for both battery charger 100 and electronic device 200 to include sensors.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An electronic device, comprising:
   a battery;
   a port for connecting a battery charger to charge said battery;
   a light emitter; and
   a sensor connected to said light emitter, for automatically activating said light emitter when the battery charger is not currently connected to said port and when the sensor detects one or more vicinity light requirements indicating a need for light in the environment of the sensor, and for automatically deactivating said light emitter when the battery charger is successfully connected to said port.

2. The electronic device of claim 1 wherein said light emitter is powered by said battery.

3. The electronic device of claim 1 wherein said sensor is powered by said battery.

4. The electronic device of claim 1 wherein said light emitter comprises at least one light emitting diode (LED).

5. The electronic device of claim 4 wherein said at least one LED comprises at least one ultraviolet LED.

6. The electronic device of claim 1 wherein said light emitter comprises an incandescent light source.

7. The electronic device of claim 1 wherein said light emitter comprises a multi-color light source.

8. The electronic device of claim 1 wherein said sensor automatically activates said light emitter when the battery charger is not currently connected to said port and when said sensor detects proximity of the battery charger.

9. The electronic device of claim 1 wherein said sensor automatically activates said light emitter when the battery charger is not currently connected to said port and when said sensor detects a dark environment.

10. The electronic device of claim 1 wherein said sensor automatically activates said light emitter when the battery charger is not currently connected to said port and when said sensor detects that it is being moved.

11. The electronic device of claim 1 wherein said sensor automatically activates said light emitter when the battery charger is not currently connected to said port and when said sensor detects an object moving in the environment.

12. The electronic device of claim 1 further comprising a control for manually activating said light emitter.

13. The electronic device of claim 12 wherein said control is a switch.

14. The electronic device of claim 12 wherein said control is a button.

15. A method for facilitating connecting an electronic device to a battery charger, comprising:
    automatically sensing one or more vicinity light requirements indicating a need for light in the environment of an electronic device and a battery charger, when the battery charger is not currently connected to the electronic device; and
    in response to said automatically sensing, activating a light source, thereby facilitating connecting the electronic device to the battery charger by a user in the environment; and
    automatically deactivating the light source when the light source has been activated for a time longer than a predefined time span.

16. The method of claim 15 wherein said automatically sensing comprises automatically sensing that the electronic device is in proximity of the battery charger.

17. The method of claim 15 wherein said automatically sensing comprises automatically sensing a dark environment.

18. The method of claim 15 wherein said automatically sensing comprises automatically sensing that an object is moving in the environment.

19. The method of claim 15 further comprising
    automatically detecting one or more shut-off conditions indicating that the light is no longer needed; and
    in response to said automatically detecting, deactivating the light source.

20. The method of claim 19 wherein said automatically detecting comprises automatically detecting successful connection of the electronic device to the battery charger.

21. The method of claim 19 wherein said automatically detecting comprises automatically detecting lack of motion in the environment.

* * * * *